United States Patent [19]

Izumi et al.

[11] 3,911,262

[45] Oct. 7, 1975

[54] DECIMAL POINT DISPLAY CIRCUIT

[75] Inventors: Yoshihiro Izumi, Suita; Tatsuo Kawasaki, Takatsuki, both of Japan

[73] Assignee: Matsushita Electronics Corporation, Osaka, Japan

[22] Filed: Mar. 18, 1974

[21] Appl. No.: 452,393

[30] Foreign Application Priority Data

Mar. 20, 1973 Japan ............................... 48-32424

[52] U.S. Cl. ............................. 235/156; 340/324 R

[51] Int. Cl.[2] ........................................ G06K 15/18

[58] Field of Search ........... 235/156, 159, 160, 164; 340/324 R, 172.5

[56] References Cited

UNITED STATES PATENTS

| | | | |
|---|---|---|---|
| 3,358,125 | 12/1967 | Rinaldi | 235/160 X |
| 3,639,734 | 2/1972 | Kimura et al. | 235/169 X |
| 3,691,358 | 9/1972 | Angelor et al. | 235/159 |
| 3,760,171 | 9/1973 | Wang | 235/156 |

*Primary Examiner*—David H. Malzahn

*Attorney, Agent, or Firm*—Stevens, Davis, Miller & Mosher

[57] ABSTRACT

A decimal point display circuit for use in an electronic desk-top calculator, etc. which displays the result of a calculation or an entry number from the higher digits when it exceeds the number of digits in the numerical display, and displays the number of digits above the decimal point but not displayed in the numerical display by a digit mark in the numerical display. Even when the number of digits of the result of a calculation or an entry number exceeds the number of digits in the numerical display, it can be displayed in such a manner that the digits in the numerical display serve as the effective digits.

4 Claims, 4 Drawing Figures

DECIMAL POINT DISPLAY CIRCUIT

This invention relates to a decimal point display circuit for giving the correct position of the decimal point for the number displayed in a numerical display, for use in an electronic desk-top calculator, etc.

In an electronic desk-top calculator, it may occur that the result of operation will have digits above those of the numerical display. In such a case, the number of digits of the result of the operation cannot be expressed by the display in the numercial display.

Namely, it becomes necessary to display the result of the operation with the effective digits represented by the digits in the numercial display and display the number of digits which are not displayed in the numercial display in a part of the numercial display.

This invention is intended to solve the above problem and provides a display circuit for the decimal point which, when the number of digits of the result of an operation above the decimal point exceeds that of the numercial display, can display the result of an operation in the numercial display from the higher order and the number of digits above the decimal point but not displayed in the numeral display separately in a part of the numercial display.

According to the decimal point display circuit of this invention, a numercial display having the effective digits represented by the digits of the numercial display portion can be provided even when the number of digits of the entry number as well as the result of an operation exceeds that in the numercial display portion.

According to a preferred embodiment of the present invention, there is provided a decimal point display circuit comprising a register for storing the position of the decimal point as one of positive and negative information controlled by an adder/subtractor, a down counter supplied with the content of said register, a control circuit for coupling said down counter and said register, a discriminator circuit for generating an operational sign for discriminating the operational sign of the content of said register and generating an output on one of positive and negative terminals according to said operational sign, and two AND gate circuits having each one input supplied with the output of said down counter and other inputs supplied with the outputs of the positive and negative terminals, respectively, said down counter being supplied through said control circuit with the content of said register directly when the number of digits above the decimal point is within that of a numercial display and in an inverted state when it exceeds that of the numercial display, said down counter being driven at timings of digit driving signals and generating an output when the content becomes zero, thereby the output of the AND gate circuit supplied with said output and the output of said discriminator circuit displaying one of the decimal point and the number of digits above the decimal point but not displayed in the numercial display, the sum of said number of digits not represented and the number of displayed digits representing the number of digits of a number to be displayed.

Now, description will be further made of a preferred embodiment in connection with the accompanying drawings, in which.

Figure 3:
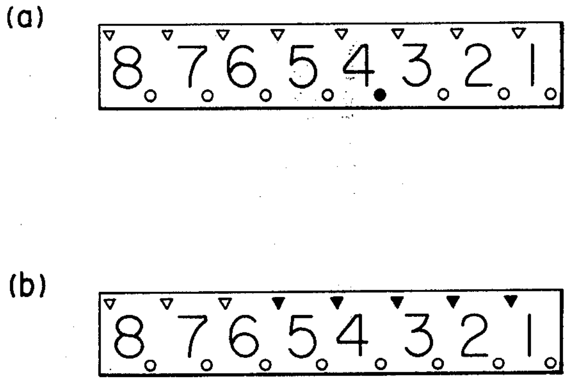

FIGS. 3*a* and 3*b* show displays of the decimal point and the digit mark according to the display circuit for the decimal point according to this invention.

Figure 1:
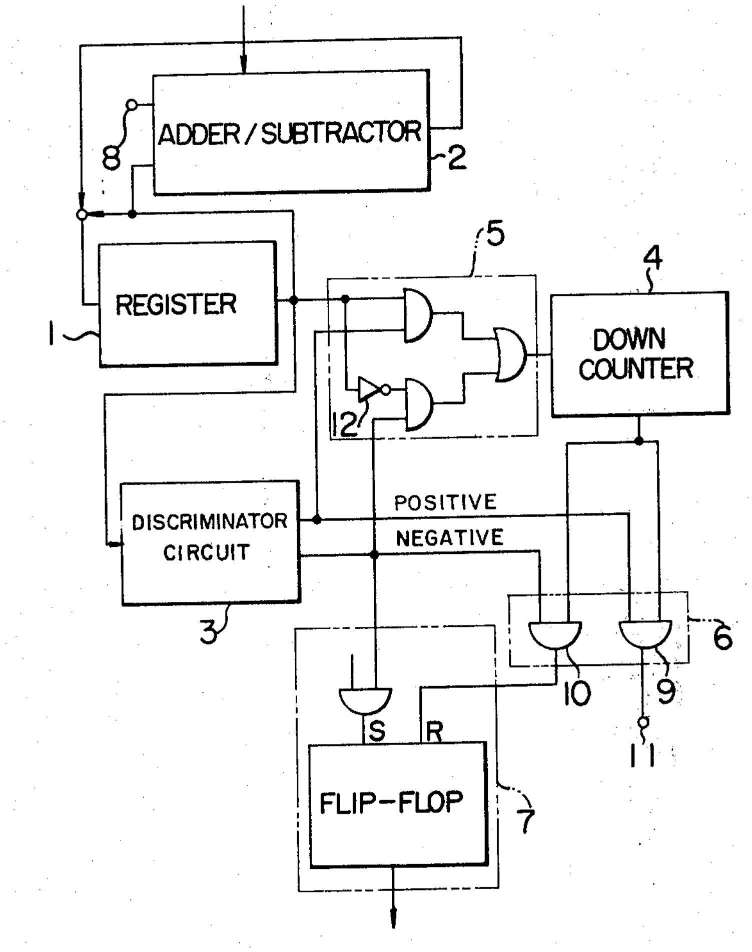
FIG. 1 is a block diagram of a display circuit for the decimal point according to an embodiment of the present invention.

FIG. 1 shows a display circuit for the decimal point, which comprises a register 1 for storing the position of the decimal point, an adder/subtractor 2, a discriminator circuit 3 for discriminating the operational sign of the decimal point, a down counter 4, a control circuit 5 for inverting the signal to be given to the down counter 4 according to the operational sign of the decimal point, a display control circuit 6 for displaying one of the decimal point or the digit mark in the numerical display according to the output of the counter 4, and a flip-flop circuit 7 for generating the driving pulses for displaying the digit mark. Here, the flip-flop circuit 7 may be dispensed with according to the display system for the digit mark.

Hereinbelow, description will be made of an example in which the above circuit is used in an electronic desk-top calculator having a numercial display of eight digits. In this case, the register 1 is of six bits and the content of the register 1 is <000000> when the decimal point lies at the lowest digit in the numercial display. When the decimal point shifts to the next lowest digit (the second digit from the lowest), a signal of "1" is supplied to the adder/subtractor 2 from a terminal 8 to change the content of the register 1 into <000001>. Similarly, when the decimal point shifts to the third digit from the lowest the content of the register 1 becomes <000010>, and when the decimal point shifts to the eighth digit the content of the register becomes <000111>.

Namely, the position of the decimal point is stored in a binary number in the register 1 of six bits.

On the other hand, when the number of digits above the decimal point exceeds eight, e.g. becomes nine, and the numercial display shows the higher eight digits, the decimal point is to be positioned on the further right side of the lowest, i.e. the right most, digit of the numercial display. Therefore, it cannot be represented in the ordinary way.

In such a state, subtraction of 1 is done in the adder/subtractor 2 to change the content of the 6-bit register 1 from <000000> to <111111>. Similarly when the number of digits above the decimal point becomes 16, the content of the register 1 becomes <111000>. Namely, assuming that the operational sign of the decimal point is positive when the decimal point lies in the range of numercial display, and negative when the number of digits above the decimal point exceeds that of the numercial display and the decimal point is located on the further right side of the lowest digit of the numercial display, the operational sign of the decimal point can be discriminated by whether the sixth bit of the register 1 is 1 or 0. Namely, when the sixth bit is 0 the operational sign of the decimal point is positive, and when it is 1 the operation sign is negative.

Figure 2:
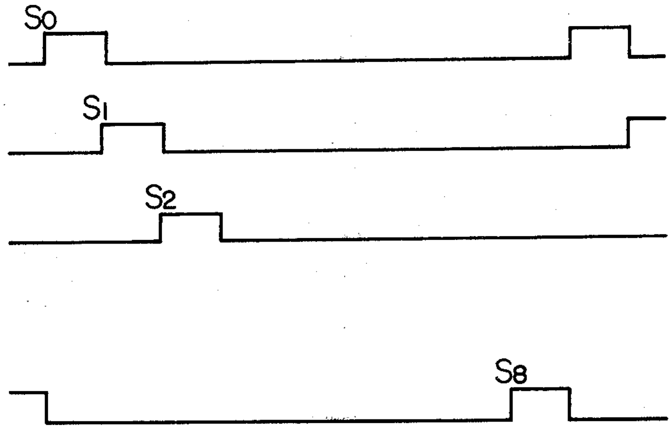
FIG. 2 is a timing chart of the digit driving signals.

The numercial display element in the numercial display portion is driven by digit selecting signals $S_1$ to $S_8$ as shown in FIG. 2. The lowest, first, digit display element is driven by the digit selecting signal $S_1$, the second digit display element by the digit selecting signal $S_2$, and the eighth digit display element by the digit selecting signal $s_8$.

Further, the decimal point driving pulse is generated in the following manner.

Namely, when the signal $S_0$ shown in the timing chart of FIG. 2 is supplied, the content of the register 1 is supplied through the control circuit 5 to the down counter 4. Each 1 is subtracted from the content of the down counter 4 by the leading edge of each signal of and after the next timing of the signal $S_1$. When the content of the down counter 4 becomes zero, the down counter 4 generates an output which is applied to each one input terminal of two AND gate circuits 9 and 10 constituting the display control circuit 6.

The other terminals of the AND gates 9 and 10 receive the output of the discriminator circuit 3. The discriminator circuit 3 generates an output at the positive terminal and applies it to the AND gate 9 when the operational sign of the decimal point is positive, and generates an output at the negative terminal and applies it to the AND gate 10 when the operational sign of the decimal point is negative.

For example, when the content of the 6-bit register 1 is +3, i.e. <000011>, an output is generated at the positive terminal of the discriminator circuit 3 and applied to the AND gate 9.

On the other hand, as is apparent from the above description, the content of the register 1 is put into the down counter 4 at the timing of the signal $S_0$. The content of the down counter 4 becomes +2, +1, and 0 at the timings of the signals $S_2$, $S_3$ and $S_4$, respectively. The down counter 4 generates an output when the content becomes zero, which is applied to the AND gates 9 and 10. Here, however, the output of the discriminator circuit 3 is applied only to the AND gate 9. Thus, an output is generated only on the output terminal 11 of the AND gate 9. Based on this output, a decimal point indicator at the fourth digit from the lowest among those provided in the numercial display is energized. FIG. 3*a* shows the state of the numercial display with the fourth decimal point indicator energized.

When the number of digits above the decimal point exceeds that of the numercial display, e.g. 13, the content of the register 1 becomes −5, i.e. <111011>.

In this case, since the sixth bit is 1, the operational sign of the decimal point is discriminated as negative and an output is generated on the negative terminal of the discriminator circuit 3 and applied to the flip-flop 7.

On the other hand, the content of the register 1 applied to the down counter 4 is inverted by an inverter 12 in the control circuit 5 to become <000100>, i.e. 4, since the operational sign of the decimal point is negative. Thus, the content of the down counter 4 becomes zero at the timing of the signal $S_5$ and an output is generated from the down counter 4 to generate an output from the AND gate 10 at this timing.

As for the flip-flop 7, since there is provided on the input side of a gating circuit which can set the flip-flop by the leading edge of the signal $S_0$ when the polarity of the decimal point is negative, when the digit marks are driven by the output of this flip-flop, the digit marks can be energized from the lower position by the timings of the digit driving signals until all output of the AND gate 10 is applied to the reset terminal R connected with said AND gate 10 as a reset signal.

Since the flip-flop 7 is reset at the timing of the signal $S_5$ which generates an output from the AND gate 10, the digit marks are not driven at the timings of the signals $S_6$ to $S_8$ arriving after the signal $S_5$ and the digit marks are energized as is shown in FIG. 3*b*. Namely, a display showing that the number of digits above the decimal point is larger than that of the numeral display by five, i.e. 13 digits, is provided. Here if the digit mark is directly driven by the output of the AND gate 10, only the fifth digit mark is energized.

What we claim is:

1. A decimal point display circuit for use with a numerical display capable of displaying a predetermined number of digits defining a number comprising, an adder/subtractor; a register connected to said adder/subtractor for storing the decimal point location of said number, the contents of said register being zero when the decimal point location being indicated is at the most right-hand digit of the digits displayed on said numerical display, greater than zero when the decimal point location is displaced to the left of said most right-hand digit and less than zero when the decimal point location is displaced to the right of the most right-hand digit; a down counter, the contents of said down counter being decreased in response to a digit timing signal; a control circuit for coupling said down counter to said register and supplying said down counter selectively with the contents or inverted contents of said register; a discriminator circuit coupled to the output of said register and having positive and negative output terminals to respectively develop outputs representing positive and negative operational signs corresponding to the location of said decimal point; and first and second AND gate circuits each having first and second inputs, the first inputs of said first and second AND gate circuits being connected respectively to the positive and negative terminals of said discriminator circuit and the second inputs of said AND gate circuits being connected to the output of said down counter, said down counter receiving the direct contents of said register when the number of digits above the decimal point is within said predetermined number and the inverted content of said register when the number of digits exceeds said predetermined number, said down counter generating a decimal point indicating signal when the contents thereof becomes zero, the outputs of said AND gate circuits indicating the position of said decimal point and the number of digits above said decimal point but not displayed in said numerical display, the sum of said number of digits not displayed and the number of displayed digits representing the number of digits above the decimal point of the number to be displayed.

2. A decimal point display circuit according to claim 1, wherein the output of said second AND gate circuit is directly connected to said numerical display, said display circuit energizing a digit mark on said numerical display located to the left of most right-hand by a number corresponding to the number of digits above said decimal point but not displayed in said numerical display.

3. A decimal point display circuit according to claim 1, wherein the output of said first AND gate circuit is directly connected to said numerical display, said display circuit energizing a decimal point indicator on said numerical display when the output of said down counter is zero and there is an output on the positive output terminal of said discriminator.

4. A decimal point display circuit according to claim 1, which further comprises a flip-flop circuit having a reset terminal, said reset terminal being connected to the output of said second AND gate circuit, said reset terminal being energized when the content of said down counter becomes zero and said discriminator generates an output at the negative output terminal thereof.

* * * * *